July 20, 1948.   M. CAWEIN ET AL   2,445,562
PANORAMIC RECEIVING SYSTEM
Filed Feb. 25, 1943   5 Sheets-Sheet 1
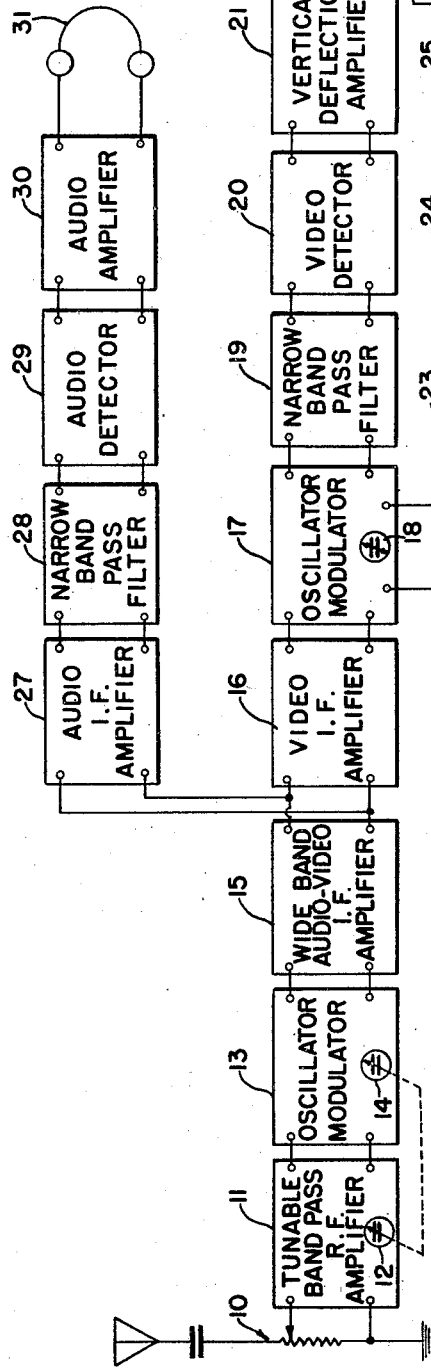
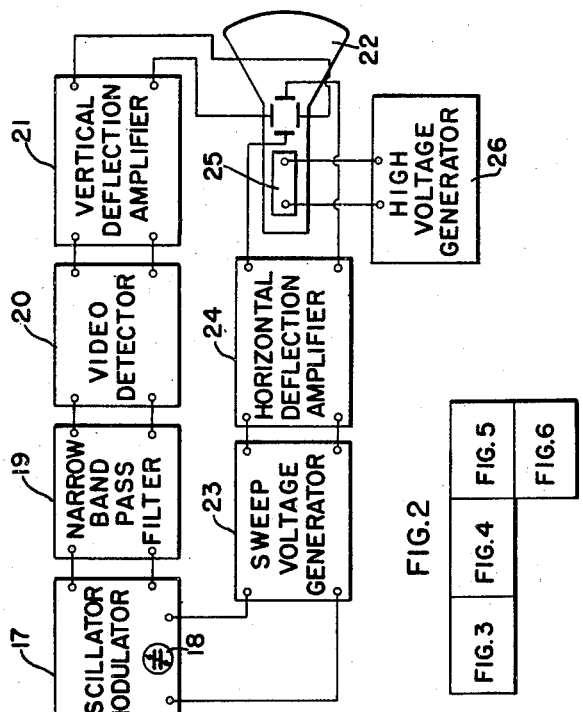
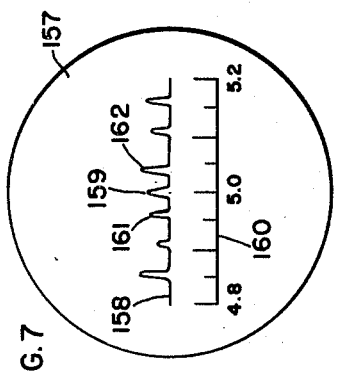
INVENTORS
MADISON CAWEIN
ROBERT W. SANDERS
BY
ATTORNEY July 20, 1948.  M. CAWEIN ET AL  2,445,562
PANORAMIC RECEIVING SYSTEM
Filed Feb. 25, 1943  5 Sheets-Sheet 3

INVENTORS
MADISON CAWEIN
ROBERT W. SANDERS
BY
ATTORNEY

FIG. 5
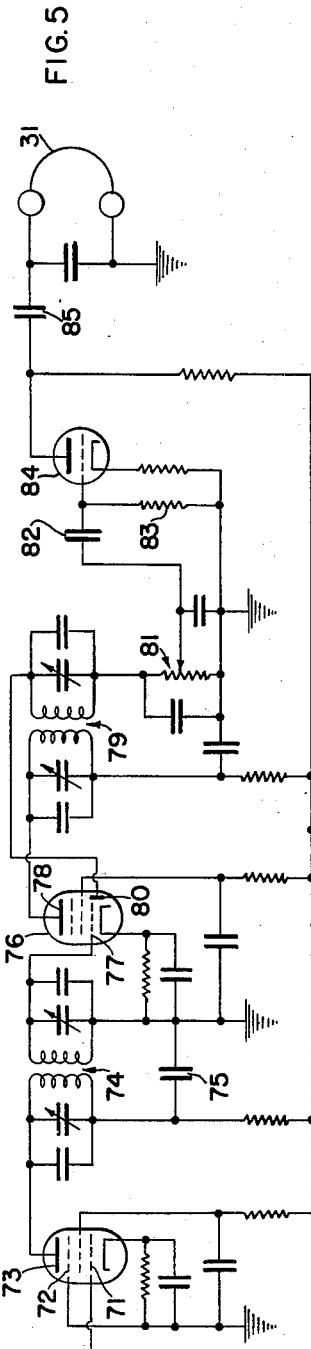
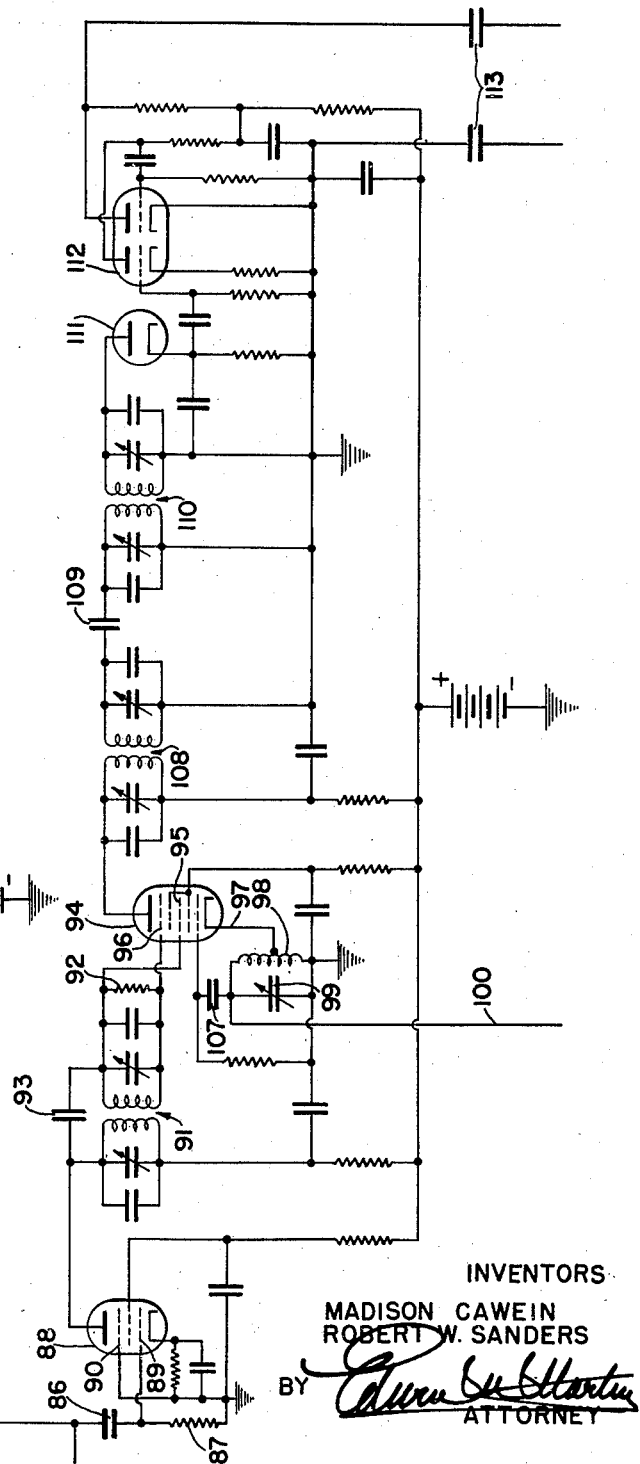

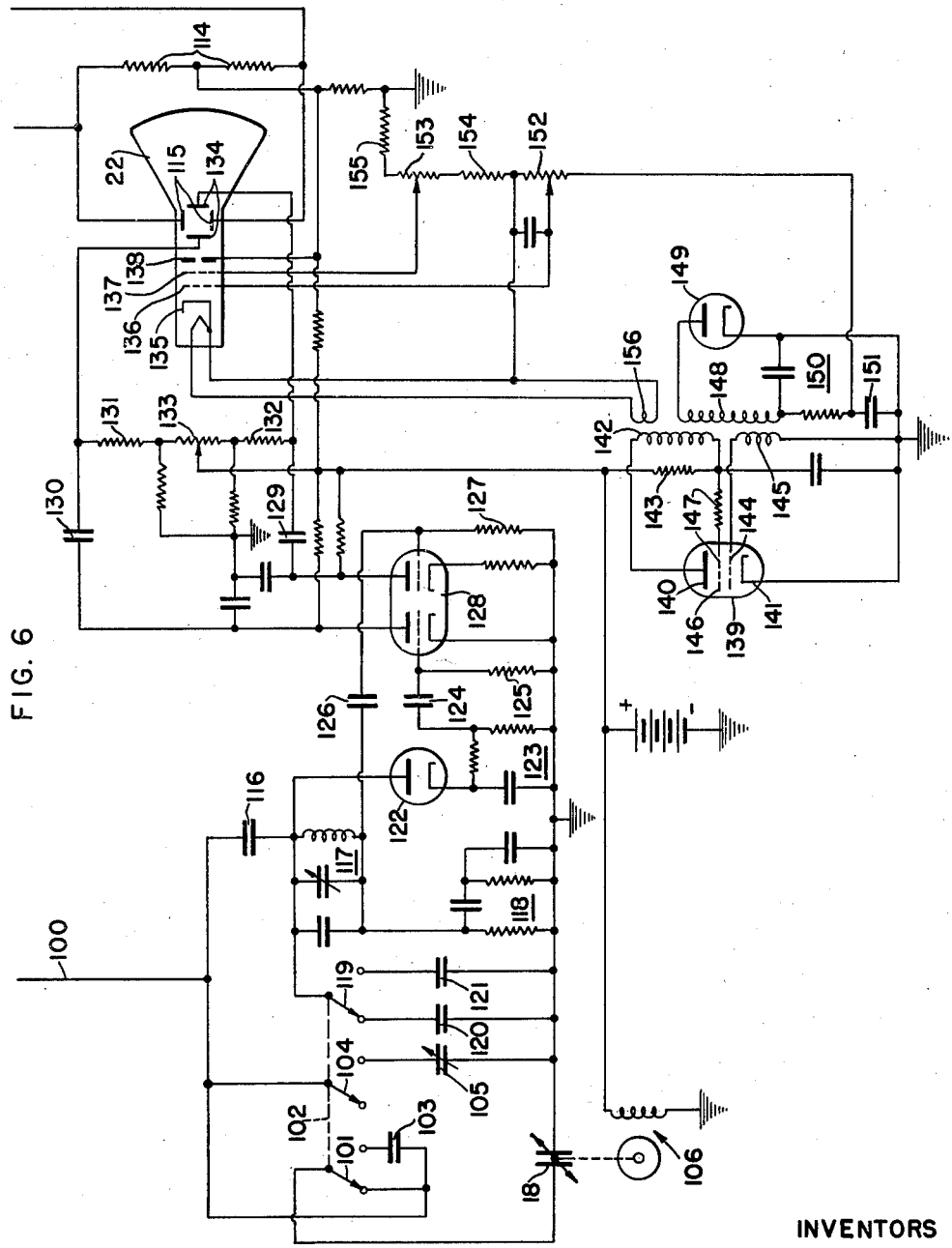

Patented July 20, 1948

2,445,562

UNITED STATES PATENT OFFICE 2,445,562

PANORAMIC RECEIVING SYSTEM

Madison Cawein and Robert W. Sanders, Fort Wayne, Ind., assignors, by mesne assignments, to Farnsworth Research Corporation, a corporation of Indiana Application February 25, 1943, Serial No. 477,048

11 Claims. (Cl. 250—20)

This invention relates to radio receiving systems and particularly to panoramic radio receivers.

According to conventional panoramic radio receiver practice it is customary to tune periodically the signal receiving circuits of the receiver over a selected band of frequencies to produce visual indications of all signalling frequencies in the band. If it is also desired to obtain aural indications of one of the frequencies in the band, a separate receiver is provided for this purpose. In order to correlate the aural indication with one of the visual indications, it is necessary to provide a special coupling between the two receivers.

As is well understood in the art, however, receiving apparatus of this type is frequently installed in a moving vehicle such as a ship or aircraft. For aircraft use particularly, lightness of weight is a necessary requirement. Hence, it is necessary to provide the minimum amount of apparatus to effect a maximum of the results desired. Also, ease and speed of operation are characteristics which preferably should be incorporated in such apparatus.

An object of the present invention, therefore, is to provide an improved panoramic radio receiver embodying facilities for simultaneously obtaining visual indications of a plurality of signal frequencies and an aural indication of one of these frequencies.

Another object of the invention is to provide, in a panoramic radio receiver which produces visual indications of a plurality of signalling frequencies, an improved means for securing positive synchronization between the sweep and signalling voltages applied to the deflecting elements of a cathode ray tube.

Another object of the invention is to provide a novel method of simultaneously translating a plurality of radio signals into visibly intelligible form, and one of these signals into audibly intelligible form.

In accordance with the present invention there is provided a band pass radio frequency amplifier which is tunable over a selected one of a plurality of divisions of the frequency spectrum. The amplified radio frequency signals within the selected band are converted to first intermediate frequencies and all are amplified simultaneously. The band of amplified first intermediate frequency signals is applied simultaneously to video and audio sections of the receiver.

In the video section of the receiver the first intermediate frequency signals are converted successively to a predetermined second intermediate frequency. The successive second intermediate frequency signals are detected, amplified and applied to the vertical deflecting elements of a cathode ray tube. The horizontal deflecting elements of the cathode ray tube are supplied with a sweep voltage which is generated under the control of the means by which the second intermediate frequencies are produced. A positive synchronization between the sweep and the signal voltages applied to the visual indicating device thus is obtained.

In the audio section of the receiver the band of first intermediate frequency signals is applied to a band pass filter, the parameters of which are adjusted to produce a response to a predetermined frequency of the band of first intermediate frequencies. The single signalling frequency, which is passed by the filter, is detected, amplified and applied to an aural indicating device. The signal heard by means of this device thus corresponds with one of the visual indications produced by the cathode ray tube.

For a better understanding of the invention, together with other and further objects thereof, reference is had to the following description, taken in connection with the accompanying drawings, and its scope will be pointed out in the appended claims.

In the accompanying drawings:

Fig. 1 is a block diagram of a superheterodyne radio receiver embodying the present invention;

Fig. 2 is an illustration of the relation of Figs. 3, 4, 5 and 6, to form a complete wiring diagram of the panoramic radio receiver;

Figure 3:
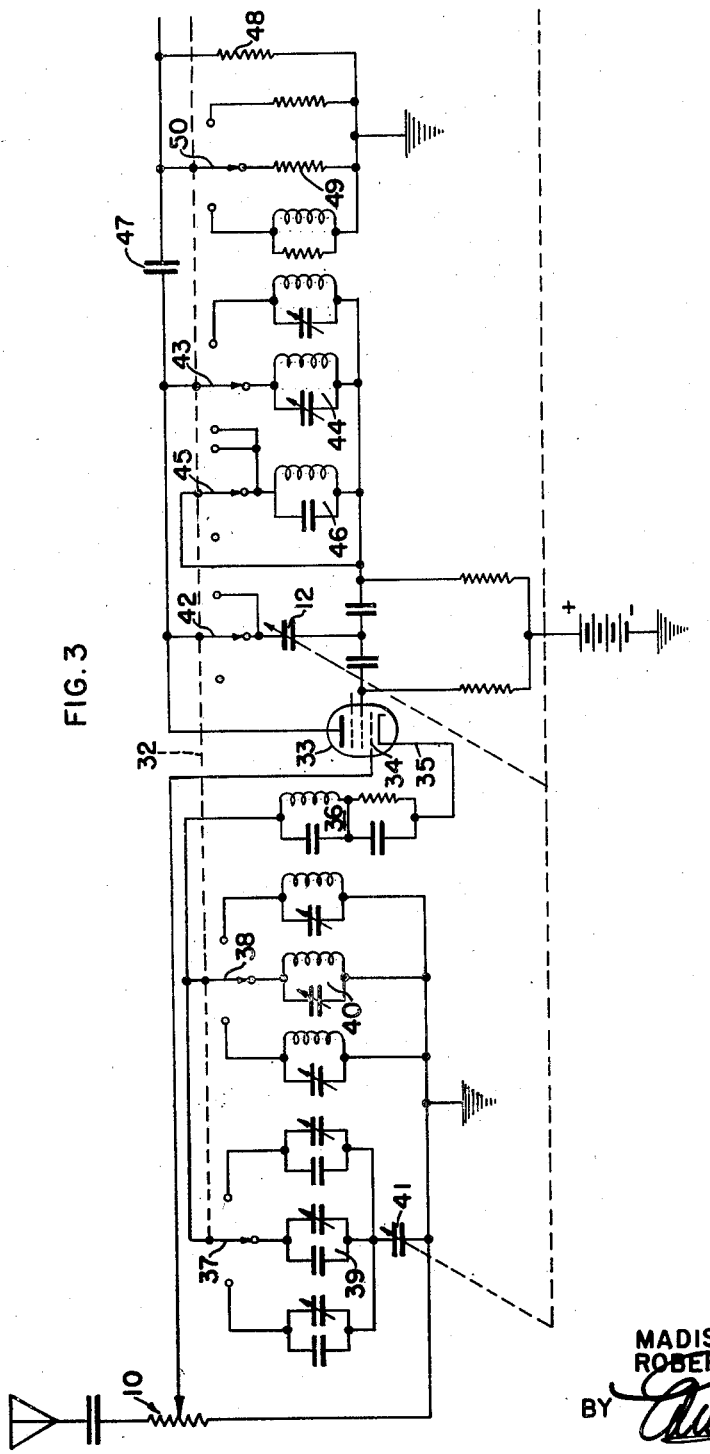
Fig. 3 shows the circuit details of the radio frequency amplifier.

Fig. 5 shows the circuit details of the audio section of the receiver including the audio channel intermediate frequency amplifier, the audio channel band pass filter, the audio channel detector and amplifier, and the aural output device. This figure also shows the circuit details of the video channel first intermediate frequency amplifier, the video channel frequency converter, the video channel detector and the vertical deflection amplifier;

Fig. 6 shows the circuit details of the sweep voltage generator, the visual output device and a high voltage generator for use with the visual output device; and Fig. 7 shows a typical visual indication produced upon the screen of the visual output device.

Referring now more particularly to Fig. 1 of the drawing, there is shown in block diagram form, a superheterodyne radio receiver in accordance with the present invention. The receiving antenna circuit 10 is coupled to a band pass radio frequency amplifier 11. This amplifier is designed to simultaneously amplify all signals within a predetermined band of frequencies. The radio frequency amplifier is provided with a tuning element such as a variable condenser 12. By means of this tuning arrangement the predetermined band of frequencies over which the amplifier is designed to operate may be shifted as desired to any selected portion of a predetermined part of the frequency spectrum. The complete frequency spectrum may be divided into several smaller parts, each of which may be examined by the panoramic receiver embodying the invention.

The band of radio frequency signals amplified by the amplifier 11 are applied to a frequency converter, such as an oscillator-modulator 13 by means of which it is converted to a band of first intermediate frequencies. The oscillator-modulator is provided with a tuning element such as a variable condenser 14 which is mechanically connected to the radio frequency amplifier tuning condenser 12. Thus, the tuning condensers 12 and 14 may be simultaneously operated to change the tuning of the radio frequency amplifier concurrently with a frequency change of the oscillator-modulator.

The first intermediate frequency band is amplified by a combined wide band audio and video channel intermediate frequency amplifier 15. The output of this amplifier is connected to a video channel intermediate frequency amplifier 16 and the band of frequencies is applied to a second frequency converter, such as an oscillator-modulator 17. This oscillator-modulator is provided with a variable condenser 18, the capacity of which is continuously varied between maximum and minimum limits. The band of first intermediate frequency signals is thus converted successively to a time-spaced series of signals of a predetermined second intermediate frequency.

The output of the oscillator-modulator 17 is coupled to a narrow band pass filter 19, the parameters of which are adjusted to produce a response only to the second intermediate frequency. The second intermediate frequency signals are rectified by a video channel detector 20 and amplified by a vertical deflection amplifier 21. The amplified signal voltages are used to produce visual representations of the signals upon a medium capable of displaying distinctive indicia representative of the signals. In the present embodiment, they are applied to the vertical deflecting plates of a cathode ray tube 22.

The oscillations generated by the oscillator-modulator 17 are also utilized to control the operation of a sweep voltage generator 23 by means of which a periodic wave of substantially saw-tooth wave form is produced. The saw-tooth wave is amplified by a horizontal deflection amplifier 24 and applied to the horizontal deflecting plates of the cathode ray tube 22. This tube is provided with an electron gun 25 which is operated by means of a high voltage generator 26.

The band of first intermediate frequency signals also is applied to an audio channel intermediate frequency amplifier 27. The amplified first intermediate frequency signals are applied to a narrow band pass filter 28, the parameters of which are adjusted to cause a response to only a predetermined one of the band of frequencies.

The predetermined frequency which thus is permitted to pass the filter 28 is rectified by an audio channel detector 29 and amplified by an audio amplifier 30. The amplified audio signals are applied to a set of head phones 31 or an equivalent aural output device.

A panoramic receiver in accordance with the present invention is designed to examine all of the signal transmission occurring within the range of predetermined frequency limits. The examination is made in several stages, in each one of which a predetermined subband comprising a small number of signalling frequencies are examined. For the purpose of this description the complete operating range of the receiver will be termed the frequency spectrum. By this term is meant all frequencies lying between two limit frequencies which are relatively widely separated. In order to simplify the design and operation of the receiver, the complete frequency spectrum is covered in several stages which are termed herein, frequency spectrum divisions. By this term is meant all frequencies lying between two limit frequencies both of which are within the complete frequency spectrum and which are relatively narrowly separated. When operating in one of the frequency spectrum divisions the receiver is designed to receive simultaneously a plurality of signalling frequencies, fewer in number than the total number included in one of the frequency spectrum divisions. This plurality of signalling frequencies is termed herein, a frequency band. By this term is meant all frequencies lying between two limit frequencies both of which are within one of the frequency spectrum divisions and which are more narrowly separated than the limit frequencies of any of the divisions.

Figure 4:
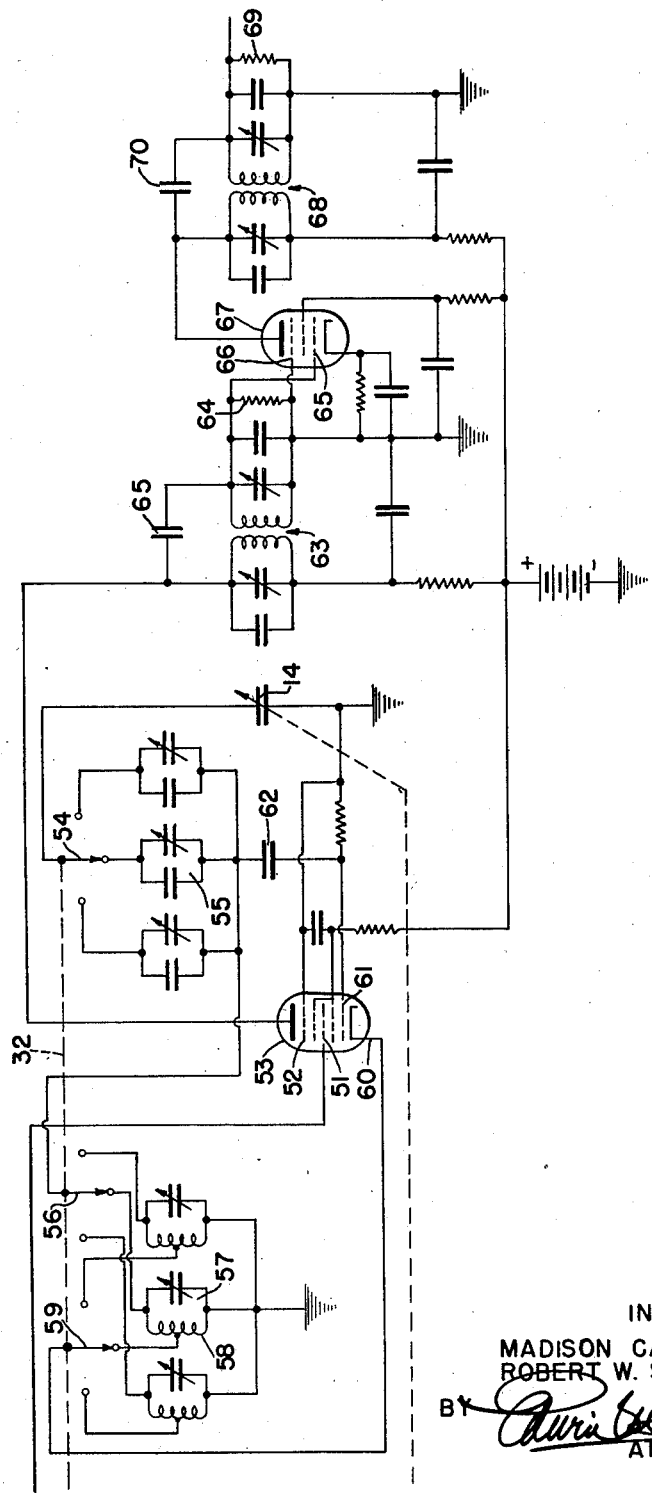
Fig. 4 shows the circuit details of the first frequency converter together with the combined audio and video intermediate frequency amplifier.

The following detailed description of the panoramic receiver embodying the invention is taken with reference to Figs. 3, 4, 5 and 6 arranged as indicated in Fig. 2. The receiver is provided with a frequency spectrum division switch 32 comprising nine switch blades mechanically, but not electrically, connected together for simultaneous operation. Each of the switch blades is adapted to be placed in any one of three contact positions for the purpose of selecting one of three divisions into which the frequency spectrum is divided. It will be understood that the showing of three frequency spectrum divisions is merely by way of illustration since it is obvious that the invention is not limited to any particular number of divisions.

All of the signalling frequencies lying within the complete frequency spectrum are collected by the antenna system 10 and impressed upon the input circuit of a band pass radio frequency amplifier. This amplifier includes a pentode tube 33 which may be a 12SG7 type or its equivalent. The received signals are impressed upon the control grid 34 and the cathode 35 of the tube. There is provided, in series with the cathode of the tube 33, a series parallel network 36 of resistance, inductance, and capacitance for the purpose of providing a self-biasing potential for the tube. The network 36 is connected to blades 37 and 38 of the spectrum division switch 32. By means of one of the contacts associated with the respective switch blades, the circuit is further extended through a condenser network such as 39 and a parallel condenser and inductor network such as 40. The condenser networks such as 39 are connected to ground in series with a variable condenser 41. The condenser-inductor network such as 40 is connected directly to ground. The parallel circuit comprising one of the condenser networks in series with the variable condenser 41 and one of the condenser-inductor networks is an image rejection circuit.

The output circuit of the tube 33 including the anode is connected through other switch blades of the frequency spectrum switch 32 to a tunable circuit. The anode is connected to a switch blade 42, and two of its contacts are connected to the variable condenser 12. The anode of the tube is also connected through a switch blade 43, and by means of one of its contacts, to a parallel condenser and inductor network such as 44. Another switch blade 45 of the spectrum division switch is provided to short circuit the condenser-inductor network 46 when either of the other two networks, such as 44, is in use. The tuning of the anode circuit of the tube 33 by the variable condenser 12 is such that all of the frequencies within a predetermined band of frequencies within a selected one of the frequency spectrum divisions are simultaneously amplified.

The amplified band of radio frequency signals is coupled by a resistance-capacitance arrangement to a first frequency converter stage. The coupling is effected by means of a condenser 47 and an arrangement of a resistor 48 connected in parallel with one of three other coupling resistors such as 49. Another switch blade 50 of the spectrum division switch 32 is provided to effect the connection of one of the other resistors, such as 49, in parallel with the resistor 48.

The band of amplified radio frequency signals is impressed between the control grid 51 and the suppressor grid 52 of an oscillator-modulator tube 53. This tube is a pentagrid and may be a 12SA7 type or its equivalent. The oscillator portion of the tube 53 is provided with a frequency-determining circuit which includes the variable condenser 14. This condenser is connected to a switch blade 54 of the spectrum switch 32 and, by means of one of the contacts associated therewith, to one of three condenser networks, such as 55. This circuit is further extended through a switch blade 56 of the spectrum division switch and one of its associated contacts to one of three parallel networks of inductance and capacitance, such as 57. Each of the inductors is provided with an intermediate tap which is respectively connected to one of the contacts associated with a switch blade 59 of the spectrum division switch. This switch blade is connected to the cathode 60 of the tube 53. The oscillator input circuit is connected to the grid 61 of the tube. This grid is coupled to the frequency-determining circuit connected to the oscillator output circut by a condenser 62. The frequency of the oscillator is changed by an adjustment of the variable condenser 14. The converted frequency output of the oscillator modulator is derived from the anode of the tube 53 and is connected to a condenser-tuned primary winding of a coupling transformer 63. This transformer is also provided with a secondary winding which is similarly tuned by a condenser and provided with a load resistance 64. The primary and secondary windings are also capacitatively coupled by a condenser 65.

The first intermediate frequency signalling voltages impressed upon the load resistor 64 are applied to the control and suppressor grids 65 and 66 respectively of a combined audio and video channel first intermediate frequency amplifier tube 67. This tube is a pentode and may be a 12SG7 type or its equivalent. The anode of the tube is connected to a condenser-tuned primary winding of a coupling transformer 68. This transformer is also provided with a condenser-tuned secondary winding inductively related to the primary winding and also provided with a load resistor 69. The primary and secondary windings of transformer 68 are also capacitatively coupled by a condenser 70.

The amplified first intermediate frequency signalling voltages appearing at the terminals of the load resistor 69 are impressed upon the control and suppressor grids 71 and 72 respectively, of an audio channel amplifier tube 73. This tube is a pentode and may be a 12SG7 type or its equivalent. The band of first intermediate frequency signals is amplified by the tube 73, the output circuit of which is connected to a condenser-tuned primary winding of a filter transformer 74. This transformer is provided with a condenser-tuned secondary winding, inductively related to the primary winding. The primary and secondary windings of the transformer 74 are also capacitatively coupled by a condenser 75. The tuning of the primary and secondary windings of this transformer is sharp so that only a single signalling frequency in the band of first intermediate frequency signals is passed.

This predetermined first intermediate frequency signal is applied to the input circuit of a second frequency converter tube 76. This tube is a diode-super-control amplifier pentode and may be a 12SF7 type or its equivalent. The predetermined intermediate frequency signalling is impressed upon the pentode grid 77 of the tube 76. The pentode plate 78 of the tube is connected to a condenser-tuned primary winding of a filter transformer 79. The diode plate 80 of the tube 76 is connected to the condenser-tuned secondary winding of the filter transformer 79. The secondary winding is also connected to the resistance portion of a potentiometer 81.

The voltage developed between the slider element of the potentiometer 81 and ground is applied by a coupling including a condenser 82 and a resistor 83 to the input circuit of an audio amplifier tube 84. This tube is a triode and may be one-half of a 12SN7-GT type or its equivalent. The output circuit of the audio amplifier tube 84 is coupled by a condenser 85 to an aural output device such as the set of head phones 31.

The band of first intermediate frequency signals derived from the load resistor 69 of the combined audio and video channel first intermediate frequency amplifier is impressed by means of a resistive-capacitative coupling including a condenser 86 and a resistor 87 upon the input circuit of the video channel first intermediate frequency amplifier. This amplifier includes a vacuum tube 88 having an input circuit including the control and suppressor grids 89 and 90 respectively. This tube is a pentode and may be a 12SG7 type or its equivalent. The output circuit of the video channel first intermediate frequency amplifier including the anode of the tube 88 is connected to the condenser-tuned primary winding of a coupling transformer 91. This transformer also has a condenser-tuned secondary winding which is connected to a load resistor 92. The primary and secondary winding of the transformer 91 are capacitatively coupled by a condenser 93.

The band of video channel first intermediate frequency signals derived from the load resistor 92 is impressed upon the signal input circuit of a second frequency converter comprising an oscillator-modulator. This oscillator-modulator includes a vacuum tube 94 having signal input grids 95 and 96 connected to the load resistor 92. This tube is a pentagrid and may be a 12SA7 type or its equivalent. The cathode 97 of the oscillator-modulator tube is connected to an intermediate tap on an inductor 98 which comprises an element of the frequency-determining circuit for the oscillator. An alignment or trimmer condenser 99 is connected in parallel with the inductor 98.

There is also connected in parallel with the inductor 98, by means of a conductor 100, the variable condenser 18. This connection is made through a switch blade 101 of a three bladed two-position sweep width switch 102. The function of this switch is to effect a change of the oscillator frequency between either relatively wide or relatively narrow limit frequencies. When a frequency change over the relatively wide band of frequencies is desired, the blades of the switch 102 are placed in engagement with their left hand contacts, as shown. In this case, there is connected in parallel with the inductor 98 a circuit extending over conductor 100, through the switch blade 101 and its left hand contact to the variable condenser 18. When the blades of the switch 102 are placed in engagement with their right hand contacts, there is connected in series with the variable condenser 18, a condenser 103 by means of the switch blade 101. Switch blade 104 connects a condenser 105 in parallel with the series arrangement of condensers 18 and 103. The capacity of the variable condenser 18 is continuously varied between maximum and minimum limits by means of a mechanical connection between the movable plates of the condenser and a motor 106.

There is provided for the oscillator, a coupling between the frequency-determining circuit and the oscillator input circuit which is effected by a condenser 107. Thus, there appears in the output circuit of the oscillator periodically a frequency-modulated wave.

By means utilizing the frequency-modulated wave all of the video channel first intermediate frequency signals are converted successively and periodically to a predetermined second intermediate frequency. This second intermediate frequency is derived from the anode of the oscillator-modulator tube 94 and is impressed upon a condenser-tuned primary winding of an output filter transformer 108. This transformer is also provided with a condenser-tuned secondary winding inductively coupled to the primary winding. Both windings of the transformer are tuned sharply for resonance at the predetermined second intermediate frequency.

The secondary winding of the transformer 108 is capacitatively coupled by a condenser 109 to the condenser-tuned primary winding of an input filter transformer 110. This transformer also is provided with a condenser-tuned secondary winding inductively related to the primary winding. Both windings of the transformer 110 are sharply tuned for resonance at the predetermined second intermediate frequency.

The second intermediate frequency signals derived from the secondary winding of the transformer 110 are demodulated by a detector tube 111. This tube is a diode and may be a 12H6 type or its equivalent with either one pair of the electrodes utilized or with both pairs of electrodes connected in multiple. The output circuit of the rectifier tube 111 is connected to the input circuit of a vertical deflection amplifier including a vacuum tube 112. This tube is a twin triode and may be a 12SL7-GT type or its equivalent.

The output circuit of the vertical deflection amplifier is coupled by means of condensers 113 to a load resistance 114. The voltages derived from the terminals from the resistance 114 are applied to the vertical deflector plates 115 of the cathode ray tube 22 or a similar visual responsive device.

The output circuit of the oscillator forming part of the second oscillator-modulator, including the tube 94, also is coupled by means of a condenser 116 to apparatus for generating a sawtooth wave from the frequency modulated wave. This apparatus includes a resonant circuit 117 comprising a parallel arrangement of inductance and capacitance. There also is provided in series with the resonant circuit 117, a load circuit 118 comprising a series parallel arrangement of resistance and capacitance. The resonant circuit 117 is sharply tuned for response at only one of the frequencies generated by the oscillator including the tube 94.

When a switch blade 119 of the sweep width switch 102 is engaged with its left hand contact, a condenser 120 is connected in parallel with the resonant circuit 117 and the load circuit 118. The resonant circuit then responds to one of the wide limit second oscillator frequencies. With the switch blade 119 engaged with its right hand contact, a condenser 121 is substituted for the condenser 120 and the resonant circuit responds to one of the narrow limit second oscillator frequencies. Thus, there is developed by the resonant circuit a series of alternating current voltage impulses occurring at a periodicity equal to the periodicity of the generated oscillator frequency to which the resonant circuit is responsive.

This series of voltage impulses is impressed upon a rectifier circuit including a rectifier tube 122. This tube is a diode and may be a 12H6 type or its equivalent with either one pair of the electrodes utilized or with both pairs of electrodes connected in multiple. There also is provided, connected to the cathode of the rectifier tube 122, a shaping or wave-forming circuit 123 comprising a series parallel arrangement of resistance and capacitance. By means of the shaping circuit 123 each of the series of direct current voltage impulses developed by the resonant circuit 117 is converted into a wave having sawtooth form. The sweep voltage generator disclosed and described herein forms the subject matter of a co-pending application of Robert W. Sanders, Serial No. 475,861, filed February 15, 1943, and entitled "Voltage generator," Patent No. 2,387,685 granted April 10, 1945.

The output circuit of the sweep voltage generator is coupled by resistive-capacitative coupling networks 124—125 and 126—127 to the horizontal deflection amplifier including a vacuum tube 128. This tube is a twin triode and may be a 12SL7-GT type or its equivalent. The output circuit of the horizontal deflection amplifier is coupled by condensers 129 and 130 to a load resistance comprising resistors 131 and 132 and a potentiometer 133. The voltages derived from the terminals of resistors 131 and 132 are impressed upon the horizontal deflector plates 134 of the cathode ray tube 22. Thus, by reason of the common control by the frequency-modulated wave generated by the second oscillator, there is provided positive synchronization of the series of time-spaced series of signals and the sweep voltage.

The cathode ray tube 22 is provided with an electron gun including a heated cathode 135, grid electrodes 136 and 137 and an anode 138. The high voltage necessary for the operation of the cathode ray tube electron gun is generated by rectifying the high voltage peaks produced by the steep wave front portions of a saw-tooth wave. The saw-tooth wave is generated by means of a high frequency oscillator including a tube 139. This tube is a beam power amplifier tube and may be a 6V6 type or its equivalent. The output circuit of the tube 139, which is derived from the anode 140 and cathode 141, is connected to a series arrangement of an inductor 142 and a resistor 143. The frequency of the oscillator is determined by the ratio of the value of the output circuit inductance to that of the internal resistance of the tube. The input circuit of the tube, which is derived from the control grid 144 and the cathode 141, includes an inductor 145 which is loosely coupled to the output circuit inductor 142. These two inductors comprise windings of an air core transformer. The screen grid 146 of the tube 139 is connected in series with a resistor 147 to a source of positive potential.

Another inductor 148, inductively related to windings 142 and 145, is connected to the input circuit of a rectifier including a tube 149. This tube is a twin diode and may be a 6H6 type or its equivalent with either one pair of electrodes used or with both pairs of electrodes connected in multiple. Connected to the cathode of the rectifier tube 149 is a shaping or wave-forming circuit 150 comprising a parallel arrangement of resistance and capacitance, together with a filter condenser 151.

By means of this arrangement, there is derived from the output circuit of the rectifier a high unidirectional voltage which is impressed upon a load impedance comprising potentiometers 152 and 153 and resistors 154 and 155. The slider element of the potentiometer 152 is connected to the grid 136 of the cathode ray tube 22 and serves to control the intensity of the electron beam. The slider element of the potentiometer 153 is connected to the cathode ray tube grid 137 and serves to control the focusing of the electron beam. Heater current for the cathode 135 of the cathode ray tube is derived from an auxiliary winding 156 coupled to the transformer windings 142 and 145. The apparatus disclosed and described herein for generating the high voltage for the cathode ray tube forms the subject matter of a co-pending application of Madison Cawein, Serial No. 471,976, filed January 11, 1943, and entitled "Unidirectional power supply," Patent No. 2,373,165 granted April 10, 1945.

In considering the operation of the panoramic receiver embodying the present invention it is believed that the following description will be clearer if there are assumed specific frequencies which are to be considered as illustrative rather than limiting. Assume that the frequency spectrum which it is desired to examine by means of the radio receiver lies between the limiting frequencies of 2 and 20 megacycles. The frequency spectrum may be assumed to be divided into three frequency spectrum divisions; the first lying between the limiting frequencies of 2.0 and 4.4 megacycles; the second lying between the limiting frequencies of 4.3 and 9.45 megacycles; and the third lying between the limiting frequencies of 9.3 and 20.5 megacycles. Also, assume that the first intermediate band of frequencies has a width of 400 kilocycles and lies between the limiting frequencies of 1.55 and 1.95 megacycles. In order to convert the radio frequency signals of the three spectrum divisions into the desired first intermediate frequency band, it is necessary that the first oscillator-modulator including the tube 53 have the following variations:

For the first spectrum division, the variation is between the limiting frequencies of 3.95 and 5.95 megacycles;

For the second spectrum division the variation is between the limiting frequencies of 6.25 and 11.0 megacycles; and For the third spectrum division the variation is between the limiting frequencies of 11.25 and 22.05 megacycles.

Also, when operating in the assumed band of first intermediate frequencies, it is necessary that the image frequency rejection circuit be adjusted to prevent the conversion of image radio frequency signals to the first intermediate frequency. These image radio frequency signals differ from the desired radio frequency signals by frequencies equal to twice the first intermediate frequencies. Consequently, it is necessary to adjust the image rejection circuits when operating in the various spectrum divisions as follows:

For the first spectrum division the variation is between the limiting frequencies of 5.9 and 7.5 megacycles;

For the second spectrum division the variation is between the limiting frequencies of 8.2 and 12.55 megacycles; and, For the third spectrum division the variation is between the limiting frequencies of 13.2 and 23.6 megacycles.

As is well understood in the art, the frequency ratios of the radio frequency tuning circuits, the oscillator tuning circuits and the image rejection tuning circuits are all different. Inasmuch as it is desired to tune all of these circuits simultaneously with a single operation of a tuning dial, the movable elements of the variable condensers 12, 14, and 41 are mechanically interconnected. Tracking between the tuning condensers is secured by the use of conventional trimmer condensers connected in the respective tuning circuits.

It is also assumed that the video channel second intermediate frequency is .295 megacycle. In order for the second oscillator-modulator, including the tube 94, to convert the 400 kilocycle band of first intermediate frequencies lying between 1.55 and 1.95 megacycles into the assumed video channel second intermediate frequency of .295 megacycle, it is necessary to effect the generation by the second oscillator of frequencies varying between the limit frequencies of 1.255 and 1.655 megacycles. When, for the purpose of making a closer scrutiny of some of the received signal frequencies, a narrower band of 150 kilocycles lying between the limit frequencies of 1.675 and 1.825 megacycles is to be converted into the assumed video channel second intermediate frequency of .295 megacycle, the second oscillator frequency is varied between the limit frequencies of 1.38 and 1.53 megacycles. It will be noted that, in both the wide and narrow bands of first intermediate frequencies, the center frequency is 1.75 megacycles. It is further assumed that the audio second intermediate frequency is 1.75 megacycles.

For the receiver to operate in the desired manner based on the foregoing assumptions, the tuning of the radio frequency amplifier circuit is arranged to provide the amplifier with a substantially uniform response throughout a 400 kilocycle band of frequencies, irrespective of the spectrum division which may be selected and the particular frequencies within the division. The primary and secondary windings of transformers 63 and 68 are tuned to pass a band of frequencies lying between the limit frequencies of 1.55 and 1.95 megacycles, constituting the first intermediate frequency band. The primary and secondary windings of the filter transformers 74 and 79 are sharply tuned to pass only the audio channel second intermediate frequency of 1.75 megacycles. The primary and secondary windings of the coupling transformer 91 are tuned to pass the band of first intermediate frequencies lying between the limiting frequencies of 1.55 and 1.95 megacycles. The primary and secondary windings of the filter transformers 108 and 110 are sharply tuned to pass only the video channel second intermediate frequency of .295 megacycle. The motor 106 is assumed to operate at a speed of 1800 R. P. M. to effect the periodic variation of the second oscillator frequency at the rate of 30 cycles per second. When this oscillator is generating frequencies varying over the wide band of 400 kilocycles, the resonant circuit 117 is sharply tuned for response at a frequency of 1.655 megacycles. When the second oscillator is generating frequencies varying over the narrow band of 150 kilocycles, the resonant circuit 117 is tuned for resonance at a frequency of 1.53. In either case, it is noted that the tuning of the resonant circuit is at the upper limiting second oscillator frequency.

Assume that the frequency of the signal of interest is 5 megacycles. Since this frequency lies within the second frequency spectrum division, the spectrum division switch 32 is operated so that the switch blades thereof are engaged with their center contacts. The tuning control is operated to vary the condensers 12, 14, and 41 until the condenser 12 is adjusted in capacity to cause the amplification by the radio frequency amplifier of all received signals within a 400 kilocycle radio frequency band between 4.8 and 5.2 megacycles. At this time the capacity of the variable condenser 14 is adjusted to effect the generation by the oscillator, including the tube 53, of a frequency of 6.75 megacycles. Also, at this time the capacity of the variable condenser 41 is adjusted to a value which will prevent the amplification by the radio frequency amplifier of the image frequencies within a 400 kilocycle band between 8.3 and 8.7 megacycles. It will be noted that the assumed signal of interest, having a frequency of 5 megacycles, lies at the center of the band passed by the radio frequency amplifier.

This band of radio frequency signals is converted by the first oscillator-modulator including the tube 53 to the band of first intermediate frequency signals between 1.55 and 1.95 megacycles, with the center frequency being 1.75 megacycles.

The band of first intermediate frequency signals is amplified by the intermediate frequency amplifier including the tubes 67 and 88, and is converted by the second oscillator-modulator including the tube 94, to the video channel second intermediate frequency of .295 megacycle. By reason of the progressive and periodic variation of the frequency generated by the oscillator including the tube 94, all first intermediate frequency signals are converted successively into a time-spaced series of video channel second intermediate frequency signals. These video channel second intermediate frequency signals are detected by apparatus including the tube 111, amplified by apparatus including tube 112 and used to effect vertical deflections of the electron beam of the cathode ray tube 22. For each cycle of operation of the variable condenser 18, the electron beam makes one horizontal sweep across the screen of the tube. Also, for each cycle of operation of the condenser 18, each signal in the 400 kilocycle band of received signals causes a vertical deflection of the beam at a point which is displaced horizontally from one side of the screen a distance corresponding to the relation of the signal frequency to the lower limit frequency of the 400 signal band.

Fig. 7 is a typical view of the screen 157 of the cathode ray tube. As the electron beam is moved from one side of the screen to the other, a horizontal trace 158 is made. For each signal of the 400 kilocycle band of received signals, a vertical trace such as 159 is made. As an auxiliary facility there may be provided with the screen a frequency scale 160 which may be linked for movement concurrently with the tuning condensers. In the assumed case under consideration, the received signal of interest, having a frequency of 5 megacycles, makes the vertical trace 159 appear at the center of the screen.

When it is desired to make a closer observation of a fewer number of received signals, the sweep width switch 102 of Fig. 6 is moved to place the switch blades in engagement with their right hand contacts. The oscillator, including the tube 94, then generates frequencies between 1.38 and 1.53 megacycles and the resonant circuit 117 is tuned for resonance at a frequency of 1.53 megacycles. In this case, only those of the first intermediate frequencies between the limiting frequencies of 1.675 and 1.825 megacycles are converted to the video channel second intermediate frequency of .295 megacycle. The center frequency is, as before, 1.75 megacycles.

As viewed on the screen 157 of Fig. 7, there will be fewer vertical traces seen, and these will be more widely spaced horizontally. In such a case only the traces 159, 161 and 162 will be visible. However, the trace 159 will still be located at the center of the screen since it represents the 5 megacycle received signal.

The first intermediate frequency band is also amplified by the audio channel intermediate frequency amplifier including the tube 73. The center frequency of 1.75 megacycles is selected by the filter transformer 74, rectified by apparatus including the tube 76 and amplified by apparatus including the tube 84. The amplification of the audio signal is controlled by an adjustment of the slider of the potentiometer 81. The audio signal is then heard in the head phones 31. Since the signal so perceived is derived from the first intermediate frequency of 1.75 megacycles, it corresponds to the radio frequency signal of 5 megacycles which appears at the center of the cathode ray tube screen.

The panoramic radio receiver embodying the instant invention thus is seen to have facilities by which certain advantageous results may be secured. By reason of the disclosed arrangement there is produced an aural response to a predetermined one of a band of first intermediate frequencies and a simultaneous visual response to the same frequency which is effected at a predetermined point on the screen of the visual output device. Thus, there is obtained simultaneous aural and visual indications, together with a frequency indication of any desired signal. Also, by reason of the generation of the spaced vertical traces upon the screen of a cathode ray tube and the production of the horizontal sweep of the electron beam under a common control, there is effected a positive synchronization between the horizontal and vertical deflecting systems of the viewing tube.

While there has been described what at present is considered the preferred embodiment of the invention, it will be obvious to those skilled in the art that various changes and modifications may be made therein without departing from the invention, and therefore, it is aimed in the appended claims to cover all such changes and modifications as fall within the true spirit and scope of the invention.

What is claimed is:

1. In a radio receiver for visually indicating a plurality of simultaneously received signals of different frequencies within a predetermined band of frequencies lying within one of a plurality of frequency spectrum divisions and for concurrently reproducing in audible form one of said signals exclusively of others of said received signals, means to select one of said spectrum divisions, a radio frequency signal amplifier having a band pass width equal to said predetermined band of frequencies and tunable over said selected spectrum division, means to convert said band of amplified radio frequency signals to a predetermined band of first intermediate frequency signals, means for selecting a predetermined one of said band of first intermediate frequency signals, means including an aural output device for translating into sound said selected signal exclusively of all other non-selected ones of said band of first intermediate frequency signals, means to generate periodically a frequency-modulated wave, means utilizing said frequency-modulated wave for converting said band of first intermediate frequency signals to a time-spaced series of signals of a single predetermined second intermediate frequency, a cathode ray tube having a fluorescent screen, means for translating said time-spaced series of signals into vertical traces on said screen, means utilizing said frequency-modulated wave to generate a saw-tooth wave, and means utilizing said saw-tooth wave to horizontally space said vertical traces on said screen, one of said traces appearing at a predetermined point on said screen and corresponding with the signal translated into sound by said aural output device.

2. In a radio receiver for visually indicating a plurality of simultaneously received signals of different frequencies within a predetermined band of frequencies lying within one of said plurality of frequency spectrum divisions and for concurrently reproducing in audible form one of said signals exclusively of others of said received signals, a frequency spectrum division switch to select one of said spectrum divisions, a radio frequency signal amplifier having a band pass width equal to said predetermined band of frequencies and tunable over said selected spectrum division, a first oscillator-modulator having a tunable frequency-determining circuit, means including said first oscillator-modulator to convert said band of amplified radio frequency signals to a predetermined band of first intermediate frequency signals, means for selecting the center frequency of said band of first intermediate frequency signals, means including an aural output device for translating into sound said selected signal exclusively of all other non-selected ones of said band of first intermediate frequency signals, a second oscillator-modulator having a progressively and periodically tunable frequency-determining circuit to generate a frequency-modulated wave, means utilizing said frequency-modulated wave for converting said band of first intermediate frequency signals to a time-spaced series of signals of a single predetermined second intermediate frequency, a cathode ray tube having vertical and horizontal deflecting elements and a fluorescent screen, means including said vertical deflecting elements for translating said time-spaced series of signals into a series of vertical traces upon said screen, means utilizing said frequency-modulated wave to generate a saw-tooth wave, and means utilizing said saw-tooth wave and including said horizontal deflecting elements to horizontally space said series of vertical traces on said screen, one of said traces appearing at the center of said screen and corresponding with the signal translated into sound by said aural output device.

3. In a radio receiver for visually indicating a plurality of simultanously received signals of different frequencies within a predetermined band of frequencies lying within one of a plurality of frequency spectrum divisions and for concurrently reproducing in audible form one of said signals exclusively of others of said received signals, a frequency spectrum division switch to select one of said spectrum divisions, a radio frequency signal amplifier having a band pass width equal to said predetermined band of frequencies, a first oscillator-modulator having a frequency determining circuit, means for concurrently tuning said radio frequency amplifier and said oscillator-modulator frequency determining circuit respectively to tune said amplifier over said selected spectrum division and to convert said band of amplified radio frequency signals to a predetermined band of first intermediate frequency signals, means for simultaneously amplifying said band of first intermediate frequency signals, an audio channel narrow band pass filter for selecting the center frequency of said band of amplified first intermediate frequency signals, means for demodulating and subsequently amplifying said selected first intermediate frequency signal, an aural output device for translating into sound said amplified selected signal exclusively of all other non-selected ones of said band of first intermediate frequency signals, a second oscillator-modulator having a frequency-determining circuit, means for progressively and periodically varying the tuning of said second oscillator-modulator frequency-determining circuit to generate a frequency-modulated wave, means utilizing said frequency-modulated wave for converting said band of first intermediate frequency signals to a time-spaced series of signals of a single predetermined second intermediate frequency, means for successively demodulating and subsequently amplifying said series of second intermediate frequency signals, a cathode ray tube having vertical and horizontal deflecting elements and a fluorescent screen, means for applying said amplified series of signals to said vertical deflecting elements, a sweep voltage generator utilizing said frequency-modulated wave to generate a periodic wave of saw-tooth form, means for amplifying said saw-tooth wave, and means for applying said amplified saw-tooth wave to said horizontal deflecting elements, whereby a horizontally spaced series of vertical traces are produced upon said screen, one of said traces appearing at the center of said screen and corresponding with the signal translated into sound by said aural output device.

4. In a radio receiver for visually indicating a plurality of simultaneously received signals of different frequencies within a predetermined band of frequencies lying within one of a plurality of frequency spectrum divisions and for concurrently reproducing in audible form one of said signals exclusively of others of said received signals, a frequency spectrum division switch to select one of said spectrum divisions, a radio frequency signal amplifier including a variable condenser and having a band pass width equal to said predetermined band of frequencies, a first oscillator-modulator having a frequency-determining circuit including a variable condenser, means for concurrently operating said radio frequency amplifier condenser and said first oscillator-modulator condenser respectively to tune said amplifier over said selected spectrum division and to convert said band of amplified radio frequency signals to a predetermined band of first intermediate frequency signals, means including a wide band amplifier for simultaneously amplifying said band of first intermediate frequency signals, an audio channel narrow band pass filter for selecting the center frequency of said band of amplified first intermediate frequency signals, an audio channel detector for demodulating said selected first intermediate frequency signal, an audio amplifier for amplifying said demodulated signal, an aural output device for translating into sound said amplified selected signal exclusively of all other non-selected ones of said band of first intermediate frequency signals, a second oscillator-modulator having a frequency-determining circuit including a variable condenser, means for progressively and periodically varying the value of said condenser to generate a frequency-modulated wave, means utilizing said frequency-modulated wave for converting said band of first intermediate frequency signals to a time-spaced series of signals of a single predetermined second intermediate frequency, a video channel detector for successively demodulating said series of second intermediate frequency signals, a vertical deflection amplifier for amplifying said demodulated series of signals, a cathode ray tube having vertical and horizontal deflecting elements and a fluorescent screen, means for applying said amplified series of signals to said vertical deflecting elements, a sweep voltage generator utilizing said frequency-modulated wave to generate a periodic wave of saw-tooth form, a horizontal deflection amplifier for amplifying said saw-tooth wave, and means for applying said amplified saw-tooth wave to said horizontal deflecting elements, whereby a horizontally spaced series of vertical traces are produced upon said screen, one of said traces appearing at the center of said screen and corresponding with the signal translated into sound by said aural output device.

5. In a radio receiver for visually indicating a plurality of different simultaneously received signals, means for converting said received signals to a time-spaced series of signals, means controlled by said converting means for generating a wave of saw-tooth form, a device having a medium adapted to display indicia, and means including said device and utilizing said saw-tooth wave for converting said time-spaced series of signals to distinctive indicia representative of said received signals for display by said medium.

6. In a radio receiver for visually indicating a plurality of different simultaneously received signals, means for converting successively and periodically said received signals to a recurring time-spaced series of signals, means controlled by said converting means for generating a periodic wave of saw-tooth form, a cathode ray tube having two sets of deflecting elements, means for applying said time-spaced series of signals to one set of said deflecting elements, and means for applying said saw-tooth wave to the other set of said deflecting elements.

7. In a panoramic radio receiver for visually indicating simultaneously a plurality of signals of different frequencies within a predetermined band of frequencies, means for generating periodically a frequency-modulated wave, means utilizing said frequency-modulated wave for converting successively and periodically said signal frequencies to a recurring time-spaced series of signals of a single predetermined frequency, means utilizing said frequency-modulated wave to produce a periodic wave of saw-tooth form, a cathode ray tube having two sets of deflecting elements, means for applying said time-spaced series of signals to one set of said deflecting elements, and means for applying said saw-tooth wave to the other set of said deflecting elements.

8. In a panoramic radio receiver for visually indicating simultaneously a plurality of signals of different frequencies within a predetermined band of frequencies, a generator of oscillations, means for effecting a predetermined periodic frequency-modulation of said generated oscillations, means utilizing said frequency-modulated oscillations for converting successively and periodically said signal frequencies to a recurring time-spaced series of signals of a single predetermined frequency, means for converting said frequency-modulated oscillations to a periodic wave of saw-tooth form, a cathode ray tube having two sets of deflecting elements, means for applying said time-spaced series of signals to one set of said deflecting elements, and means for applying said saw-tooth wave to the other set of said deflecting elements.

9. In a panoramic radio receiver for visually indicating simultaneously a plurality of signals of different frequencies within a predetermined band of frequencies, a generator of oscillations, means for effecting a predetermined periodic frequency modulation of said generated oscillations, means utilizing said frequency-modulated oscillations for converting successively and periodically said signal frequencies to a recurring time-spaced series of signals of a single predetermined frequency, means for converting said frequency-modulated oscillations to a series of direct current voltage impulses, means for converting said direct current voltages to a periodic wave of saw-tooth form, a cathode ray tube having vertical and horizontal deflecting elements, means for applying said time-spaced series of signals to said vertical deflecting elements, and means for applying said saw-tooth wave to said horizontal deflecting elements.

10. In a panoramic radio receiver for visually indicating simultaneously a plurality of signals of different frequencies within a predetermined band of frequencies, an oscillation generator having a frequency-determining circuit including a variable condenser, means for progressively and periodically varying the value of said condenser to effect a predetermined periodic frequency modulation of a wave, means utilizing said frequency-modulated wave for converting successively and periodically said signal frequencies to a recurring time-spaced series of signals of a single predetermined frequency, means for developing from said frequency-modulated wave a series of alternating current voltages, means for converting said series of alternating current voltages to a series of direct current voltages, means for converting said direct current voltages to a periodic wave of saw-tooth form, a cathode ray tube having vertical and horizontal deflecting elements, means for applying said time-spaced series of signals to said vertical deflecting elements, and means for applying said saw-tooth wave to said horizontal deflecting elements.

11. In a panoramic radio receiver for visually indicating simultaneously a plurality of signals of different frequencies within a predetermined band of frequencies, an electronic oscillation generator having a frequency determining circuit including a variable condenser, means for progressively and periodically varying the value of said condenser to effect a predetermined periodic frequency modulation of a wave, means utilizing said frequency-modulated wave for converting successively and periodically said signal frequencies to a recurring time-spaced series of signals of a single predetermined frequency, means including a resonant circuit for developing from said frequency-modulated wave a series of alternating current voltages, a rectifier for converting said series of alternating current voltages to a series of direct current voltages, means including a shaping network for converting said direct current voltages to a periodic wave of saw-tooth form, a cathode ray tube having vertical and horizontal deflecting elements, means for applying said time-spaced series of signals to said vertical deflecting elements, and means for applying said saw-tooth wave to said horizontal deflecting elements.

MADISON CAWEIN.
ROBERT W. SANDERS.

REFERENCES CITED

The following references are of record in the file of this patent:

UNITED STATES PATENTS

| Number | Name | Date |
|---|---|---|
| 1,917,268 | Mirick | July 11, 1933 |
| 1,959,388 | Shiokawa | May 22, 1934 |
| 1,994,232 | Schuck, Jr. | Mar. 12, 1935 |
| 2,082,317 | Barber | June 1, 1937 |
| 2,038,054 | Nicolson | Apr. 21, 1936 |
| 2,084,760 | Beverage | June 22, 1937 |
| 2,100,402 | Lyons | Nov. 30, 1937 |
| 2,150,562 | Reid | Mar. 14, 1939 |
| 2,159,790 | Freystedt et al. | May 23, 1939 |
| 2,180,944 | Linsell | Nov. 21, 1939 |
| 2,213,886 | Potter | Sept. 3, 1940 |
| 2,273,914 | Wallace | Feb. 24, 1942 |
| 2,279,151 | Wallace | Apr. 7, 1942 |
| Re. 22,150 | Bango et al. | Aug. 4, 1942 |
| 2,367,907 | Wallace | Jan. 23, 1945 |
| 2,381,940 | Wallace et al. | Aug. 14, 1945 |

FOREIGN PATENTS

| Number | Country | Date |
|---|---|---|
| 113,637 | Australia | Aug. 31, 1941 |

OTHER REFERENCES

Panoramic Radio Spectroscopes, publication Panoramic Radio Corp., New York, N. Y., published prior to Feb. 1943, 8 pages. (Copy available for reference in Div. 51.)